US00RE37460B1

(19) United States
(12) Reissued Patent
Price et al.

(10) Patent Number: US RE37,460 E
(45) Date of Reissued Patent: Dec. 4, 2001

(54) METHOD AND APPARATUS FOR DEBARKING LOGS

(75) Inventors: John P. Price; Donald V. Woodham, both of Monticello, AR (US)

(73) Assignee: Price Industries, Inc., Jones Mill, AR (US)

(21) Appl. No.: 08/294,730

(22) Filed: Aug. 23, 1994

Related U.S. Patent Documents

Reissue of:
(64) Patent No.: 5,044,412
Issued: Sep. 3, 1991
Appl. No.: 07/278,778
Filed: Dec. 2, 1988

(51) Int. Cl.[7] ..... B27L 1/02
(52) U.S. Cl. ..... 144/208.9; 144/242.1; 144/250.17; 144/246.1; 144/341; 198/624; 198/836.1
(58) Field of Search ..... 144/2 Z, 208 R, 144/208 B, 242 R, 242 D, 246 R, 340, 341, 342, 24.13, 208.1, 208.9, 242.1, 248.6, 250.17; 198/587, 624, 804, 836.1

(56) References Cited

U.S. PATENT DOCUMENTS

| | | | |
|---|---|---|---|
| 3,457,975 | 7/1969 | Wehr et al. | 144/2 Z X |
| 3,913,644 | 10/1975 | Braun | 144/208 E |
| 4,180,109 | 12/1979 | Heikkinen | 144/208 B |
| 4,362,195 | 12/1982 | Hill | 144/242 R |
| 4,369,823 | 1/1983 | Gustafsson | 144/208 E X |
| 4,374,533 | 2/1983 | Svensson | 144/208 B |
| 4,432,403 | 2/1984 | Heikkinen | 144/208 D |
| 4,774,987 | 10/1988 | Sepling | 144/208 B |

FOREIGN PATENT DOCUMENTS 874347 5/1980 (SU) .

OTHER PUBLICATIONS

Knight, D.K., "Powells "Progress" to Chip Mill," *Timber Processing* Vo. 12, No. 1, Jan. 1987, Hatton–Brown Publishers, Inc., Montgomery, Alabama, cover page, pp. 3, 18, 19.

*Primary Examiner*—W. Donald Bray
(74) *Attorney, Agent, or Firm*—Ray F. Cox, Jr.

(57) ABSTRACT

Apparatus request for debarking logs comprising a generally horizontal rotary drum debarker having an inlet end, power drive device for continuously rotating the drum of the debarker generally about a horizontal axis, generally horizontal main conveyor element for conveying groups of tree length logs toward the drum, the main conveyor element having a discharge end below the axis of rotation of the drum, drive apparatus for continuously driving the main conveyor element, and auxiliary feed mechanism below the axis of rotation of the drum and between the discharge end of the main conveyor element and the inlet end of the drum for assisting the movement of groups of logs fed by the main conveyor element into the inlet end of the drum. +rr The questions raised in reexamination request No. 90/003,655, filed Dec. 7, 1994, 90/003,826 filed May 8, 1995, and 90/004,552 filed Feb. 12, 1997 have been considered and the results thereof are reflected in this reissue patent which constitutes the reexamination certificate required by 35 U.S.C. 307 as provided in 37 CFR 1.570(e).

22 Claims, 3 Drawing Sheets

METHOD AND APPARATUS FOR DEBARKING LOGS

Matter enclosed in heavy brackets [ ] appears in the original patent but forms no part of this reissue specification; matter printed in italics indicates the additions made by reissue.

The present invention relates to a method and apparatus for debarking logs. More particularly, the invention hod and apparatus for debarking tree length logs for efficient high yield further processing to obtain high grade wood chips, or good lumber of substantial lengths, but which can also be used to debark logs of virtually any length.

BACKGROUND OF THE INVENTION

The most efficient and economical way to debark logs is with the horizontal drum debarker. The drum debarker has a continuously rotating drum which rotates groups of logs so they rub against each other to remove the bark from the logs without any appreciable wear to the drum. To obtain good debarking efficiency, at least several logs must be in the same axial region of the drum, so they can rub against each other to remove the bark. The logs are usually fed into the drum in a continuous stream of groups of logs from an elevated curved hopper at one end of the drum and slide by gravity into the drum.

A hopper dimensioned to feed groups of relatively short logs of up to perhaps fifteen feet in length into the drum, does not work well with longer logs. Very long logs such as tree length logs, tend to jam and are bent by the hopper and drum when their lower ends enter the drum and the logs begin to rotate while their upper ends are still above the hopper inlet. Long logs in this position are rotated by the drum and are often damaged by rubbing against the hopper inlet, and the resultant reverse bending sometimes causes such long logs to break.

While it may be possible to efficiently debark tree length logs by using a much larger hopper, such a hopper would be very high and difficult to feed logs into, the hopper would be quite expensive, and shorter logs would not feed efficiently through such a larger hopper.

Thus, is has been necessary in the past to cut or slash tree length logs to shorter debarking length, before feeding the logs into the hopper. However, the saw used for cutting or slashing logs is costly to install and maintain, and there is some kerf i.e., blade width loss when logs are cut with a saw.

Other disadvantages of shorter logs is that there are more ends, which are subject to brooming, shorter logs often tumble in the debarking drum which causes more end damage, and shorter logs are less efficiently chipped, and yield less usable lumber.

On the other hand, debarked tree length logs provide a higher yield of usable lumber, and a higher yield of high quality uniform size chips for pulp can also be obtained from debarked tree length logs.

The problem has been that there was previously no efficient reliable way to debark tree length logs with a drum barker.

In addition to directing relatively short logs into the drum, the hopper for such logs performs a containment function on the logs entering the drum. As the leading ends of the logs enter the continuously rotating drum and engage the inside of the drum, the logs begin to rotate while they are partly in the hopper. Such rotation sometimes causes additional rotation of upstream logs in the hopper by friction, and often causes a somewhat violent whipping motion of the logs entering the drum, which is restricted and contained by the upstream logs in the hopper and the thick walls of the hopper.

It has been proposed to feed tree length logs into a debarking drum with a nearly horizontal conveyor. To obtain efficient debarking, the tree length logs must be fed in groups of stacked or side by side logs. The problem with this technique is that the very long logs, perhaps sixty feet in length, begin to rotate and tumble soon after their leading ends enter the drum, while substantial lengths of the logs are still on the conveyor. The rotating and flailing motion of the logs can cause severe damage to the conveyor chain, and the trailing ends of logs leaving the conveyor can catch on and can be grabbed by the downwardly and rearwardly moving return portion of the conveyor. This can cause the trailing end of a log to be pushed down and pulled rearwardly so that the log jams in the chain while its leading end is whipped around by the drum. While the conveyor chain is quite strong and can support and move groups of heavy logs, localized stress in individual links caused by impact, or by grabbing a log at the nose end of the conveyor can damage the chain.

A further problem is that logs partly in the drum which are rotating tend to rotate trailing logs on the conveyor by friction.

There is therefor, a need for an efficient and reliable technique and apparatus for debarking logs of virtually any length, including tree length logs, in a rotating drum debarker.

SUMMARY OF THE INVENTION

In accordance with the invention a method and apparatus is provided for continuously debarking tree length logs in a rotary drum debarker, without danger of damage to the conveyor chain, and which is efficient, reliable, and quite economical.

This is accomplished by using a somewhat conventional chain conveyor, and providing an auxiliary feed means in the form of a conveyor or low friction feed region between the nose or head end of the chain conveyor and the debarking drum inlet, to avoid damage to the conveyor chain, while continuously feeding stacks or groups of any length logs, into the continuously rotating debarking drum.

The purpose of the auxiliary feed means or low friction region is to shield the head end of the main conveyor and to provide a region between the main conveyor and the drum inlet where there is minimal binding or jamming of trailing ends of logs being rotated by the drum.

In accordance with one aspect of the invention, the auxiliary feed means is a very rugged auxiliary conveyor located between the head end of the chain conveyor and the inlet of the debarking drum. In a preferred embodiment, this auxiliary conveyor is a feed roller driven independently of the conveyor chain, so that it can be driven at any desired surface speed i.e. the same as or faster or slower than the surface speed of the conveyor chain.

In accordance with another aspect of the invention, a short low friction region is provided between the conveyor and the inlet of the drum debarker. This region can be composed of one or more rotatable rollers.

In accordance with another aspect of the invention, a forward region of the main conveyor is provided with smooth upright sidewalls of a sufficient height to contain the trailing ends of the logs partly in the debarking drum, so the whipping motion of the logs is minimized. without hampering the forward movement of the logs into the debarking drum. A sidewall height higher than the elevation of the centerline of the debarking drum is usually necessary, but this height can be lower than the height of the top of the drum for construction economy.

A distinct advantage of the apparatus is that the conveyor has an open top along its entire length, so that the entire length of the conveyor is available for overhead loading of logs to be debarked. At the forward or head end of the conveyor, adjacent the debarking drum inlet, is a drum end protector plate, having an opening therein of a diameter slightly less than the inner diameter of the drum and which prevents the leading ends of the conveyed logs from impacting against the inlet end of the drum. Structural elements which extend over the head end of the conveyor are provided for securing the protector plate, but these elements are adjacent the inlet of the debarking drum and do not interfere with overhead loading of logs on the conveyor.

Accordingly, it is an object of the invention to provide a method and apparatus for continuously debarking tree length logs in a rotating drum debarker, by continuously feeding groups of tree length logs generally axially into the drum with a continuously driven main conveyor, and along a low friction region or auxiliary feed means between the discharge end of the main conveyor and the inlet of the drum.

Another object is a method and apparatus according to the above object in which the auxiliary feed means is an auxiliary conveyor.

Another object is a method and apparatus in which the auxiliary feed means is a low friction region having at least one rotatable roller.

Another object is a method and apparatus in which the auxiliary feed means is a rugged roller driven in rotation.

A further object is a method and apparatus in which the auxiliary feed means is a robust roller power driven independently of the main conveyor.

A further object is an apparatus according to one or more of the above objects, in which the top of the apparatus is open and unobstructed for loading logs or timber onto the apparatus along substantially its entire length.

A further object is an apparatus according to one or more of the above objects, in which the low friction region or auxiliary conveyor occupies only a short longitudinal region between the main conveyor and the inlet of the drum.

An additional object is a method and apparatus according to one or more of the above objects in which the sidewalls of the conveyor are smooth and upright to minimize the tendency for rotating logs partly in the drum to roll up or climb up the walls of the conveyor.

Other objects and advantages of the invention will become apparent from the drawings and the description which follows which are given as non limiting examples.

DETAILED DESCRIPTION

Figure 1:
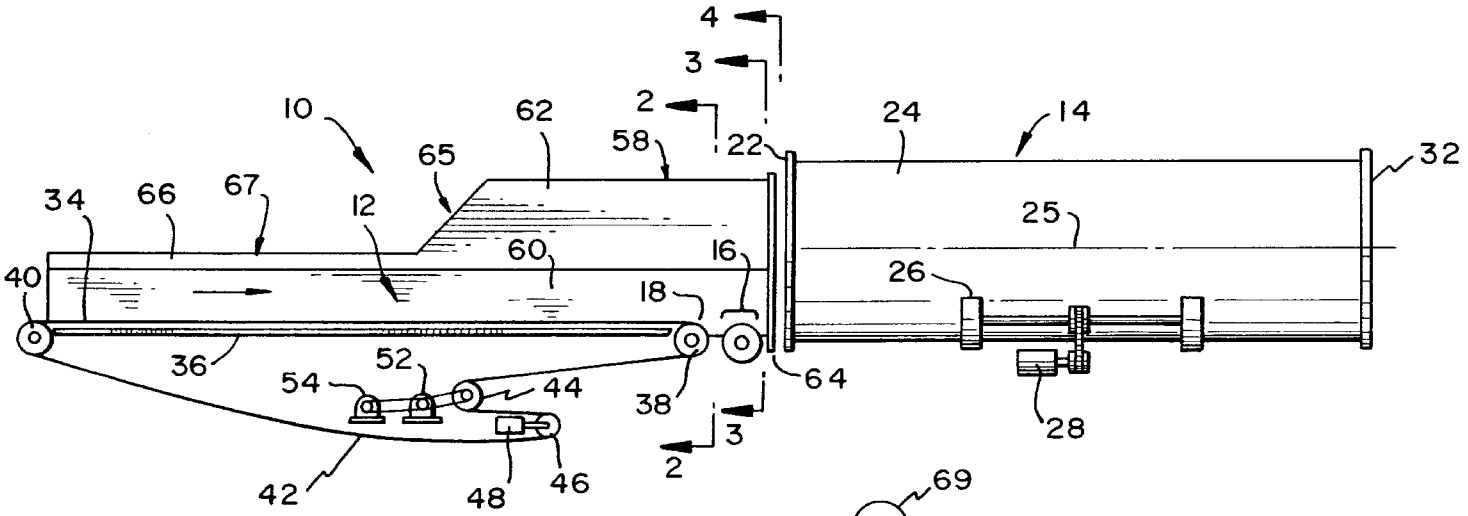
FIG. 1 is a schematic side view in elevation of the system and apparatus of the invention.

FIG. 1 shows, according to the invention, a log feeding assembly 10 for continuously feeding groups of logs into a drum debarker 14. The feeding assembly 10 includes a main conveyor 12, and a low friction region in the form of an auxiliary conveyor 16, which is between the discharge end 18 of the main conveyor 12 and the inlet end 22 of the drum debarker 14.

The drum debarker 14 is of conventional construction and includes a drum 24 which rotates about an essentially horizontal axis 25, being supported in a cradle of rollers or tires 26, which are driven by a variable speed hydraulic motor 28 to drive the drum in rotation. It is preferred to use a drum 24 which is cylindrical and of uniform inside diameter from its inlet end 22 to its outlet end 32.

Main conveyor 12 has a conveying chain 34 which runs along a bed 36 between a headspool 38 at the discharge end 18 of the conveyor, and a tailspool 40 at the upstream end of the conveyor. Chain 34 has a return portion 42 beneath the conveyor bed, and extends around a drive sprocket 44 and a chain take-up spool 46 mounted on an hydraulic cylinder 48, so that the spool 46 can be extended and retracted to vary the tension in the return run 42 of the chain. Drive sprocket 44 is chain driven by a speed reducer 52, which is belt driven by a reversible electric drive motor 54. This drive arrangement enables the conveyor to be driven in reverse, if required.

Figure 2:
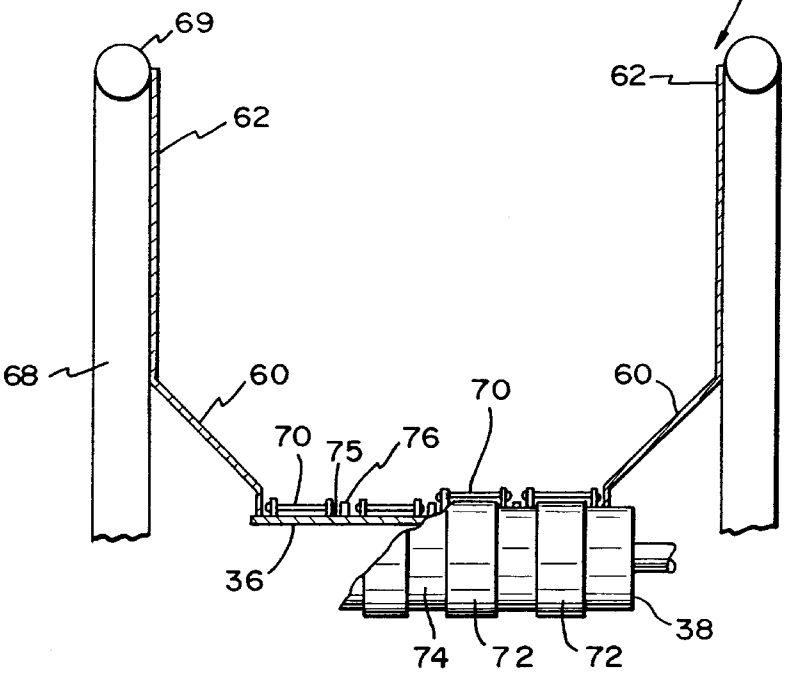
FIG. 2 is an enlarged view looking along lines 2—2 of FIG. 1, and shows the structure of the head or discharge end of the main conveyor.

As shown in FIGS. 1 and 2, a front series 58 of assembly 10 has sloping trough position 60 and high upright sides 62 which extend to the front 64 of the feed assembly 10. The sloping trough portions extend the entire length of the assembly. The high sides 62 decrease in height at 65, and merge with lower upright sides 66 that extend along the rearward section 67 of the main conveyor. The sloping trough portions 60 and the sides 62 and 66 are made of steel plate to provide smooth inner surfaces along which the logs can slide. As shown in FIG. 2, the steel plate is supported by structural elements such as I beams 68, to which the plate is welded. Lengths of circular pipe 69 (FIG. 2) are fixed at the top ends of the sides, along the entire length of the assembly 10 to minimize damage to, and catching of logs along the top of the assembly.

In the installation shown, where the debarking drum is on the order of 11 feet in diameter, and 60 feet long, assembly 10 is 60 feet long, with the front section 58 being 20 feet long, and the rearward section 67 whose sides merge upwardly into the front section at 65, being 40 feet long. The sides 62 extend upwardly to an elevation somewhat higher than the axis 25 of the drum 24, and in the embodiment shown, are only slightly lower than the top of the debarking drum 24. The top of the log feeding assembly 10 is open and unobstructed along its length, except at the very front 64, so that logs can be loaded directly onto the assembly from any position along the length of the assembly.

As shown at FIG. 2, the main conveyor has four chains 70. These chains extend around and are guided by the sides of cylindrical portions 72 of the headspool 38, when the links 73 engage the slightly smaller diameter cylindrical portions 74 of the headspool. The upper surface 75 of the conveyor bed 36 is smooth and flat, so the chains can slide along the conveyor bed between the guide bars 76.

Figure 3:
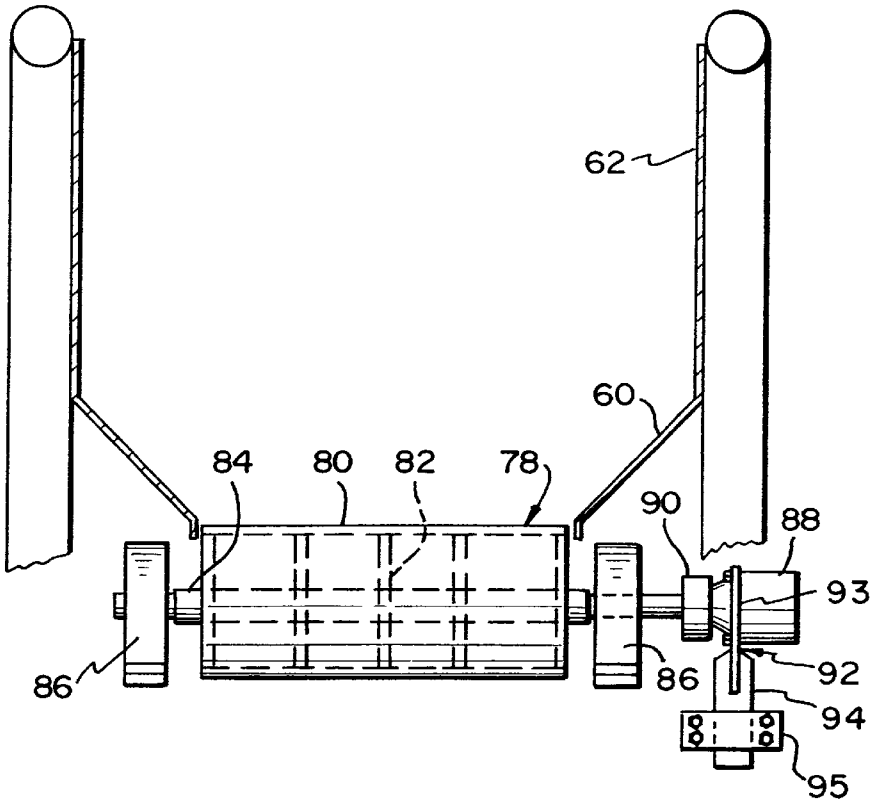
FIG. 3 is an enlarged view looking along lines 3—3 of FIG. 1, and shows a first embodiment of low friction means in the form of a driven roller.
Figure 5:
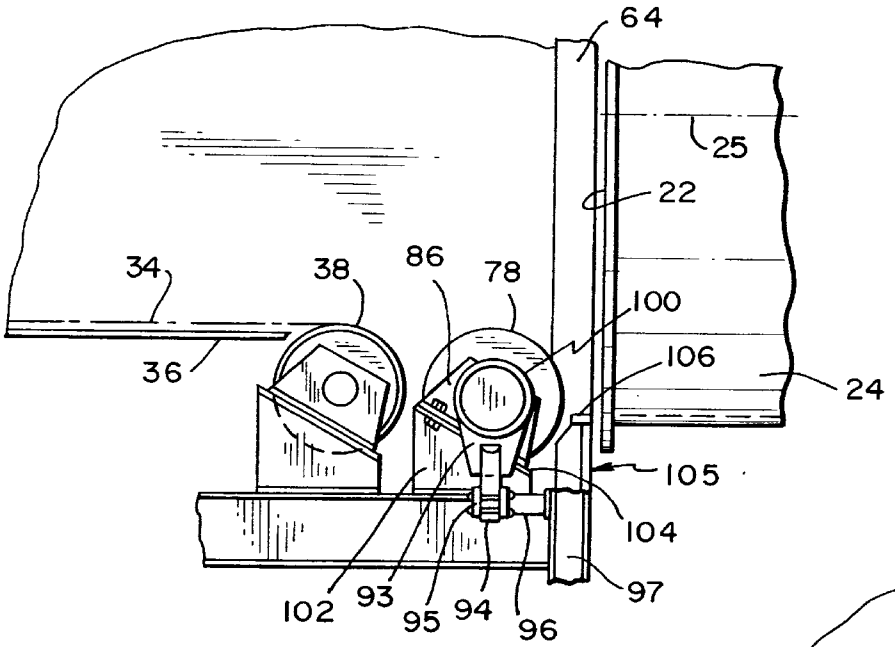
FIG. 5 is an enlarged partial view in side elevation of the apparatus in the region of the head end of the conveyor, and shows the driven roller and its mounting.

FIGS. 3 and 5 show one embodiment of auxiliary feed means 16 in the form of a driven cylindrical roller 78 with a smooth exterior surface. Roller 78 is of fabricated construction and includes a cylindrical shell 80 internally reinforced with spaced apart circular disks 82 welded to the inside of the shell, and a shaft 84 keyed to one or more of the disks. Shaft 84 is mounted in bearing blocks 86, and an hydraulic drive motor 88 is coupled to one end of shaft 84 by a flexible coupling 90. The hydraulic motor 88 is fixed to and supported by a torque arm 92 which has a flat plate upper portion 93, secured to a downwardly extending tubular arm 94, the lower end of which is clamped between clamp plates 95 of a rubber containing shock unit 96 secured to a structural column 97 of the assembly. As shown at FIG. 5, the hydraulic motor 88 has a circular mounting flange 100 which is bolted to the upper portion 93 of the torque arm which has a matching circular array of both holes, and a central opening (not shown) for the drive shaft.

The bearing blocks 86 are bolted respectively to support blocks 102, and spacers or shims 104 are provided between the bearing blocks 86 and the support blocks 102. By changing the thickness of the spacers 104, the height of the roller 78 can be adjusted. Adjustment of the height of the roller requires adjustment of the torque arm which is facilitated by the clamp plates 95, which need only be loosened during the adjustment, and then retightened after the roller 78 is adjusted to the desired height. A roller shield 105 is provided at the discharge end of the assembly. The shield includes a plate 106 spaced slightly from the periphery of the roller 78 and which extends horizontally across the assembly at about the elevation of the effective bottom of the inside of drum 24. This shield 105 prevents the trailing ends of logs from catching or jamming below the roller 78.

As shown in FIG. 3, the roller 78 is of a length to extend between the sides of the trough portions 60, so that the top of the roller 78 can be positioned at the elevation of the top of the conveyor chain 34. As shown at FIG. 5, the roller 78 is positioned closely adjacent to the headspool 38, and just before the inlet 22 of the drum 24.

Figure 4:
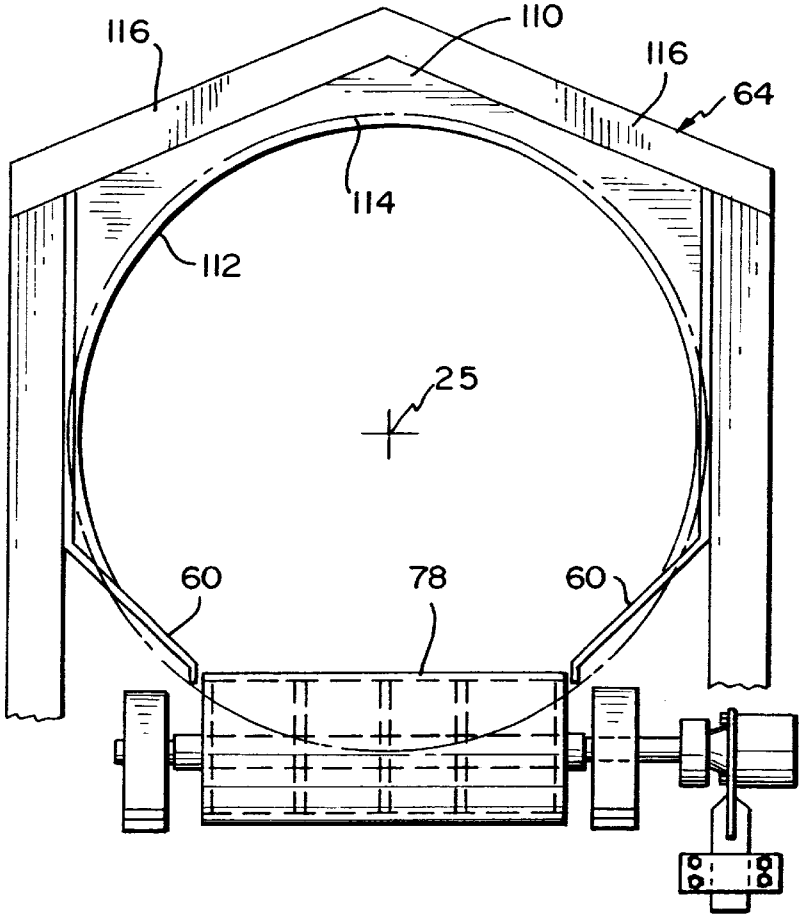
FIG. 4 is an enlarged view looking along lines 4—4 of FIG. 1, from the position of an observer at the inlet of the debarking drum.

FIG. 4 shows a drum end protector plate 110 mounted at the end 64 of the assembly, adjacent to the inlet 22 of the debarking drum 24. Protector plate 110 extends upwardly from the sloping trough portions and has an arcuate partial circle opening 112 of a diameter slightly less than the effective inside diameter of drum 24. The portions of plate 110 outwardly of the opening 112 prevent logs from striking the end face of the drum 24 at its inlet 22, and the edges of the opening 112 contain logs partly in the drum and prevent the logs from rubbing on the inlet edge of the drum. The center of opening 112 is generally aligned with the axis 25 of the drum 24. For reference, the inside diameter 114 of the drum 24 is shown in phantom lines at FIG. 4. It can be seen that the lower portion of the drum inlet is protected in part by the trough portions 60 and the roller 78. To provide support for protector plate 110, and to strengthen the end assembly 64, structural elements in the form of beams 116 are secured to the upper edges of plate 110, and to the upper ends of the side columns of end assembly 64.

Structural elements such as pipes or beams can be used instead of protector plate 110. Such elements, when used, will shield the end of the drum to prevent logs from striking the drum end.

It can be seen from FIGS. 4 and 5 that the top of roller 78 is somewhat above the level of the bottom of the inside of the debarking drum 24. Where the drum 24 is of a diameter of 11 feet, the roller 78 is mounted so its top surface is about 1½ feet above the bottom of the inside of the drum 24. The roller 78 is of a diameter slightly greater than the diameter of the headspool 38, and the top of the roller 78 is substantially in the plane of the top of the conveyor chain 34. The space required for the roller 78, is quite short, longitudinally in the direction of feed, and is only about 3 feet when the roller is 2½ feet in diameter. This 3 foot space is substantially less than either the width of the conveyor which is on the order of ten feet wide between its sides 62, or the diameter of the drum 24 which is about 11 feet.

In operation of the apparatus shown at FIGS. 1 to 5, groups of tree length logs are loaded onto the continuously driven main conveyor 12 with an overhead crane or a forklift loader. The logs move into the drum 24 at an elevation slightly above the bottom of the inside of the drum. Logs partly in the drum begin to rotate and often tilt while their trailing ends are still on the main conveyor 12, and these trailing ends often flail about and sometimes orbit. The trailing ends of the so moving logs can slide on the smooth inner surfaces of the trough 60 and sides 62 of the main conveyor. When the logs move further into the drum the forward ends of some logs tilt down so that the logs press against the roller 78 while they rotate. The rotating roller 78 provides a low friction moving surface which permits logs pressed against the roller to rotate, so the logs have less tendency to climb across the roller and jam against other logs. This action enables the logs to be advanced by the roller 78, as well as by the push of upstream logs on the main conveyor. The roller 78 is positioned sufficiently close to headspool 38 that the trailing ends of logs are prevented from catching at the head end of the conveyor and being pulled back, which could damage the chain.

It is preferred to rotate roller 78 at a surface speed slightly greater than the surface speed of chain 34 so that the roller provides a positive feeding action. However, the roller can if desired, be rotated at a surface speed the same as or lower than the surface speed of the conveyor chain, and any of these speeds can be obtained by adjusting the speed of the hydraulic motor 88.

Figure 6:
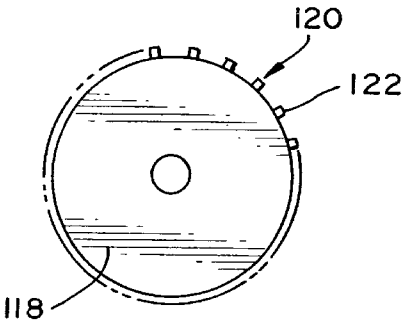
FIG. 6 is a side view of a second form of driven roller.

The roller 78 shown at FIGS. 3 and 5 has a smooth cylindrical outer surface. The embodiment of roller 118 shown at FIG. 6 has on its outer surface, circumferentially spaced axial ribs 120. Ribs 120 are straight, extend the length of the roller 118, and have outer edges 122 which act as low friction surfaces that allow logs engaging the ribs 118 to rotate while the ribs provide a more positive forward drive action to convey the logs into the drum. Where the roller 118 is on the order of 2½ feet in diameter, the ribs can be about ½ inch wide and 1 inch high, and spaced 3 to 5 inches apart around the periphery of the roller.

Figure 7:
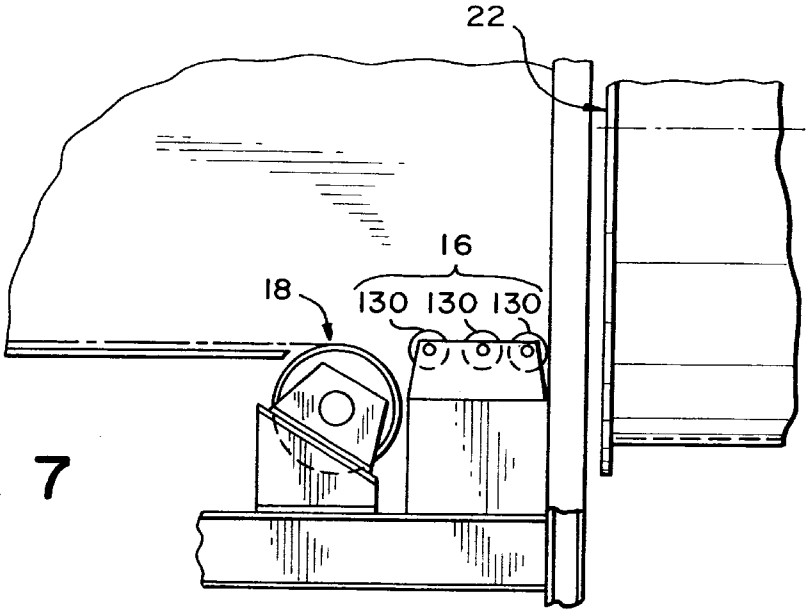
FIG. 7 is a view corresponding to FIG. 5, and showing a second embodiment of low friction means in the form of rotatable rollers.

FIG. 7 shows another embodiment of a low friction region 16 usable between the head end 18 of the conveyor and the inlet 22 of the debarking drum 24. In this embodiment, three rollers 130 are provided. Each roller is mounted in bearings, so the rollers can freely rotate. The rollers are horizontal and coplaner, and the top surface of each roller is coplaner with the top of the conveying chain. These rollers function to protect the head end of the conveyor chain, and provide a low friction region of short length between the main conveyor and the inlet of the drum. These rollers 130 do not provide the positive feeding action of the driven roller 78, and exhibit higher friction than the driven roller 78, but are satisfactory in some installations.

The stand or mounting block 132 for the rollers 130 is of adjustable height, with shims (not shown) being provided between the bottom of the block and the beam 134, so the rollers if desired, can be raised to an elevation above the conveyor chain, or can be lowered to an elevation below the conveyor chain.

While preferred embodiments have been shown and described changes and variations can be made without departing from the scope of the invention.

We claim:

1. Apparatus for debarking logs comprising, a generally horizontal rotary drum debarker having an inlet end, power means for continuously rotating the drum of the debarker generally about a horizontal axis, generally horizontal main conveyor means for conveying groups of tree length logs toward said drum, said main conveyor means having a discharge end below the axis of rotation of said drum, drive means for continuously driving the main conveyor means, and auxiliary feed means below the axis of rotation of the drum and between the discharge end of said main conveyor means and the inlet end of said drum for assisting the movement of groups of logs fed by said main conveyor means into said inlet end of the drum, *said auxiliary feed means having a low friction region.*

2. Apparatus according to claim 1 wherein, said low friction region is substantially at the elevation of the chain of said main conveyor, and has a length in the feed direction which is less than the diameter of the debarking drum.

3. Apparatus according to claim 2 wherein, said low friction region comprises at least one horizontal roller, and means mounting said roller for rotation.

4. Apparatus according to claim 1 wherein, said low friction region comprises a plurality of side by side generally coplanar horizontal rollers mounted for rotation.

5. Apparatus according to claim 1 wherein, said main conveyor has sides with smooth inner surfaces extending upwardly to an elevation above the centerline of the debarker drum along a length of the apparatus beginning upstream of said discharge end of the conveyor and extending along said low friction region.

6. Apparatus for debarking tree length logs comprising, a generally horizontal rotary drum debarker having an inlet end, power means for continuously rotating the drum of the debarker about a generally horizontal axis of rotation, generally horizontal chain conveyor means having a conveying surface below the axis of rotation of the drum for conveying groups of tree length logs toward said drum, said [main] *chain* conveyor means having a chain return headspool at its discharge end, drive means for continuously driving [the] *said* chain conveyor means,

*a low friction region comprising* a horizontal roller below the axis of rotation of the drum and between the discharge end of said [main] *chain* conveyor means and the inlet end of said debarking drum, and drive means for rotating said roller.

7. Apparatus according to claim 6 wherein said drive means for rotating said roller comprises drive means for rotating the roller independently of the drive means for driving [the main] *said chain* conveyor means, so that the roller can be rotated at a surface speed different from the surface speed of said chain conveyor *means*.

8. Apparatus according to claim 7 wherein said drive means comprises a variable speed hydraulic motor.

9. Apparatus according to claim 6 wherein the distance between the discharge end of [the main conveyor] *said chain conveyor means* and the inlet end of the debarking drum is not substantially greater than several diameters of said roller.

10. Apparatus according to claim 6 wherein said roller comprises a roller having a smooth exterior surface.

11. Apparatus according to claim 6 wherein said roller comprises a roller having circumferentially spaced apart ribs extending generally axially along its exterior surface.

12. Apparatus according to claim 6 wherein said [main conveyor] *chain conveyor means* comprises a conveyor having sides with smooth inner surfaces, said sides extending upwardly to an elevation substantially higher than the elevation of the center line of the debarking drum along a length of the conveyor near the discharge end of the conveyor.

13. Apparatus according to claim 12 wherein said sides are substantially upright.

14. Apparatus according to claim 13 wherein said apparatus has an open top along substantially its entire length to permit loading logs onto the apparatus.

15. Apparatus according to claim 14, further comprising, a stationary guide plate having an opening therein of a diameter not greater than the inside diameter of the debarking drum, and means mounting said plate between said roller and the inlet end of the debarking drum.

16. Apparatus for debarking logs comprising, a generally horizontal rotary drum debarker having an inlet end, power means for continuously rotating the drum of the debarker, generally horizontal main conveyor means for conveying groups of tree length logs toward said drum, said main conveyor means having a discharge end, drive means for continuously driving the main conveyor means, and auxiliary feed means between the discharge end of said main conveyor means and the inlet end of said drum for assisting the movement of groups of logs fed by said main conveyor means into said inlet end of the drum, and wherein, said main conveyor means comprises a link chain conveyor having a chain return headspool at its discharge end, and said auxiliary feed means comprising means defining a low friction region of short length in the feed direction of logs and close to said headspool for preventing trailing ends of logs from catching in the return position of the chain.

17. Apparatus according to claim 16 wherein, said low friction region is substantially at the elevation of the chain of said main conveyor, and has a length in the feed direction which is less than the diameter of the debarking column.

18. Apparatus according to claim 17 wherein, said low friction region comprises at least one horizontal roller, and means mounting said roller for rotation.

19. Apparatus according to claim 16 wherein, said low friction region comprises a plurality of side by side generally coplanar horizontal rollers mounted for rotation.

20. Apparatus according to claim 16 wherein, said main conveyor has sides with smooth inner surfaces extending upwardly to an elevation above the centerline of the debarker drum along a length of the apparatus beginning upstream of said discharge end of the conveyor and extending along said low friction region.

21. Apparatus for debarking tree length logs comprising, a generally horizontal rotary drum debarker having an inlet end, power means for continuously rotating the drum of the debarker, generally horizontal main conveyor means for conveying groups of tree length logs toward said drum, said main conveyor means having a discharge end, drive means for continuously driving the main conveyor means, a horizontal roller between the discharge end of said main conveyor means and the inlet end of said debarking drum, variable speed hydraulic motor drive means for rotating said roller independently of the drive means for driving the main conveyor means, and wherein, said roller comprising a shaft mounted for rotation in bearings at opposite ends of said roller, and said apparatus further comprises, a motor support outwardly of one of said bearings, means connecting said motor support to said apparatus, means mounting said hydraulic motor on said motor support, and means connecting said motor to said shaft for driving the roller in rotation.

22. Apparatus according to claim 21 further comprising means mounting said bearings for adjustment vertically to adjust the height of said roller, and wherein, said means connecting said motor support to said apparatus comprises a vertically adjustable clamp.

* * * * *

UNITED STATES PATENT AND TRADEMARK OFFICE

CERTIFICATE OF CORRECTION

PATENT NO. : RE 37,460 E
DATED : December 4, 2001
INVENTOR(S) : Price J. et al.

It is certified that error appears in the above-identified patent and that said Letters Patent is hereby corrected as shown below:

Column 8,
Line 50, delete "position" and substitute therefor -- portion --.

Signed and Sealed this

Twenty-first Day of May, 2002

*Attest:*

*Attesting Officer*

JAMES E. ROGAN
*Director of the United States Patent and Trademark Office*